United States Patent [19]

Okada et al.

[11] 4,136,384
[45] Jan. 23, 1979

[54] LOOP TYPE DATA HIGHWAY SYSTEM

[75] Inventors: Masakazu Okada; Jushi Ide; Seiichi Yasumoto; Hitoshi Fushimi, all of Hitachi, Japan

[73] Assignee: Hitachi, Ltd., Japan

[21] Appl. No.: 781,020

[22] Filed: Mar. 24, 1977

[30] Foreign Application Priority Data

Mar. 29, 1976 [JP] Japan .................................. 51-33662

[51] Int. Cl.$^2$ ............................................. G06F 3/04
[52] U.S. Cl. ................................................. 364/200
[58] Field of Search ... 364/200 MS File, 900 MS File, 364/200, 900

[56] References Cited

U.S. PATENT DOCUMENTS

| 3,879,710 | 4/1975 | Maxenichuk et al. | 340/172.5 |
|---|---|---|---|
| 4,019,176 | 4/1977 | Cour et al. | 340/172.5 |

Primary Examiner—Gareth D. Shaw
Assistant Examiner—C. T. Bartz
Attorney, Agent, or Firm—Craig & Antonelli

[57] ABSTRACT

A loop type data highway system in which a plurality of data transmission control stations (abbreviated hereinafter as stations) are connected to a single loop transmission line for data transmission and reception between any desired ones. A transmit station transmitting data makes a compare check to compare successive predetermined unit lengths of the transmitted data with the corresponding ones of the data returning after travelling round the loop, thereby detecting an error occurring during the data transmission when non-coincidence exists therebetween. A receive station receiving the data monitors the number of data words to be received, thereby detecting an error occurring during the data transmission when a data transmission end signal is detected prior to arrival of all the data words. Upon detection of the error occurring during the data transmission, the transmit station transmits the data transmission end signal to the receive station to inform the receive station of occurrence of the error.

5 Claims, 5 Drawing Figures

LOOP TYPE DATA HIGHWAY SYSTEM

BACKGROUND OF THE INVENTION

1. Field of the Invention

This invention relates to a loop type data highway system in which various data-processing devices dispersedly distributed in a wide area are connected into a closed loop through a common bus and any one of these devices occupies the bus at any desired time so as to transfer information in series in a time division mode. More particularly, this invention relates to the art of data error check control in such a data highway system so as to improve the reliability of transmitted information and efficiency of transmission.

2. Description of the Prior Art

Various data highway systems of the loop type have been proposed heretofore as, for example, those disclosed in U.S. Pat. No. 3,639,904 invented by Jeganandaraj A. Arulpragasam, and U.S. Pat. No. 3,863,220 invented by A. Osawa et al. In connection with data transmission by way of such a loop type data highway system, various error detection methods have been proposed. One of the prior art methods comprises affixing an error check code to the end of a frame to be transmitted from a transmit station, transmitting the frame including the error check code to a receive station from the transmit station, and detecting an error, if any, in the receive station on the basis of the error check code. (Ref: W. W. Peterson "Cyclic Codes for Error Detection" Proc. IRE, Vol. 49, pp. 228-235)

According to this method, however, an error cannot be detected until the entire frame is received by the receive station. Thus, when, for example, an error occurs in the frame being transmitted, transmission of ensuing data is quite wasteful resulting in an undesirable reduction in the efficiency of data transmission.

Further, this error detection method is defective in that there is a probability of leaving an error undetected since this method uses an error check code generator, and that error detection becomes impossible when the length of the frame exceeds a predetermined limit. Therefore, the prior art error detection method is not suitable for application to a system which requires high reliability and a system which handles a large amount of data.

SUMMARY OF THE INVENTION

It is an object of the present invention to provide a novel and improved loop type data highway system in which the length of time required for error detection after occurrence of an error during data transmission is shortened, thereby further improving the efficiency of data transmission.

Another object of the present invention is to provide a loop type data highway system which ensures higher probability of error detection, thereby realizing further enhancement of the reliability of transmitted information.

Still another object of the present invention is to provide a loop type data highway system which realizes enhancement of the reliability of transmitted information and improves the efficiency of transmission.

One of the important features of the present invention resides in the fact that, in a station transmitting data, predetermined unit lengths of the transmitted data and those received after travelling round the loop are successively subjected to a compare check so as to detect occurrence of an error during the data transmission when there is non-coincidence therebetween.

Another important feature of the present invention resides in the fact that, in a station receiving the data, the number of data words to be received is continuously monitored so as to detect occurrence of an error during the data transmission when a data transmission end signal arrives prior to arrival of the predetermined data words.

Still another important feature of the present invention resides in the fact that, upon detection of an error occurred during the data transmission, the transmit station sends out immediately a data transmission end signal to inform the receive station of the occurrence of the error.

DESCRIPTION OF THE PREFERRED EMBODIMENT

Figure 1:
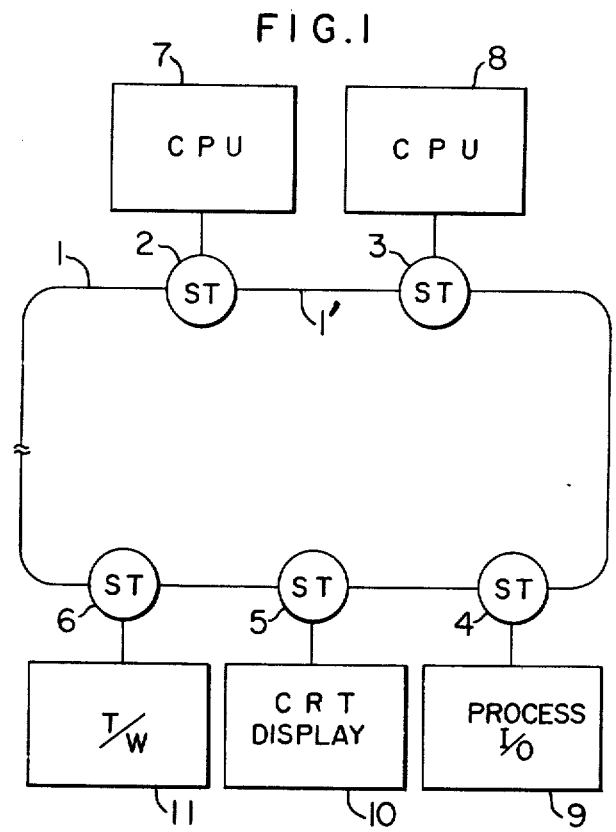
FIG. 1 is a diagram showing a general arrangement of a loop type data highway system to which the present invention is applied.

Referring to FIG. 1 showing a general arrangement of a loop type data highway system to which the present invention is applied, a plurality of stations (ST) 2 to 6 form a closed loop by being connected with one another by a single loop transmission line 1. A computer (CPU) 7 is connected to the station 2, and another computer (CPU) 8 is connected to the station 3. A process input/output unit (I/O) 9 is connected to the station 4, and a cathode-ray tube display (CRT) 10 is connected to the station 5, while a typewriter (T/W) 11 is connected to the station 6. These various data processing devices 7 to 11 are interconnected through the stations 2 to 6 so that transfer of information can be carried out between any desired two points on the loop.

Figure 2:
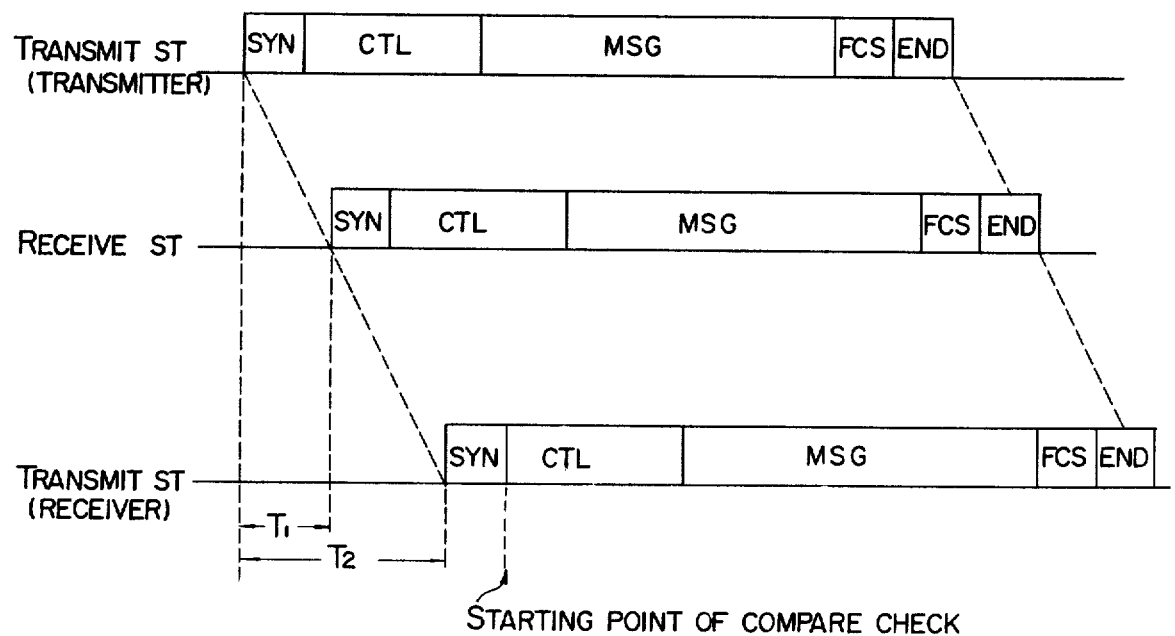
FIG. 2 shows a transmission format commonly employed in the art of data transmission.

FIG. 2 shows a transmission format commonly employed in a loop type data highway system as shown in FIG. 1. Such a format is also employed in the present invention. FIG. 2 shows also the manner in which one frame transmitted from a transmit station is received by the transmit station again after being received by a receive station. Referring to FIG. 2, the frame comprises a synchronizing code SYN for frame synchronization, a control field CTL including information such as a transmit station address, a receive station address, a command and a data count DC used for transmission control, a message field MSG including a message transmitted from a transmit station to a receive station, a frame check field FCS for frame error control, and an end code END indicating the end of the frame. It will be apparent from FIG. 2 that it takes a period of time $T_1$ for the frame sent out from a transmit station to reach a receive station, and a period of time $T_2$ to return to the transmit station again after travelling round the loop.

Before describing the present invention in detail, the manner of error detection according to the aforementioned prior art method will be described. After the transmit station sent out the synchronizing code SYN, it generates an error code while sending out the control information part CTL including at least the number of transfer data words, and the transfer message information part MSG in the above order. The transmit station sends out the result of error code generation as the frame check part FCS upon sending out the MSG part, and then, it sends out the end code END. After detection of the synchronizing code SYN, the receive station starts to take in the frame, and at the same time, it makes error code generation in a manner similar to that carried out in the transmit station to compare the result of error code generation appearing at the time of complete reception of the MSG part with the FCS part of the frame received after the arrival of the MSG part to seek coincidence therebetween for the purpose of error detection. When coincidence is detected, the receive station decides that the received data are correct and starts to control the data-processing device which may be the computer or process input/output unit connected therewith.

Such prior art error detection method has had the aforementioned defects which lead to difficulty of data transmission in a system which requires high reliability or a system which handles a large amount of data, due to the reduced efficiency of data transmission or due to the lack of reliability of error detection.

Figure 3:
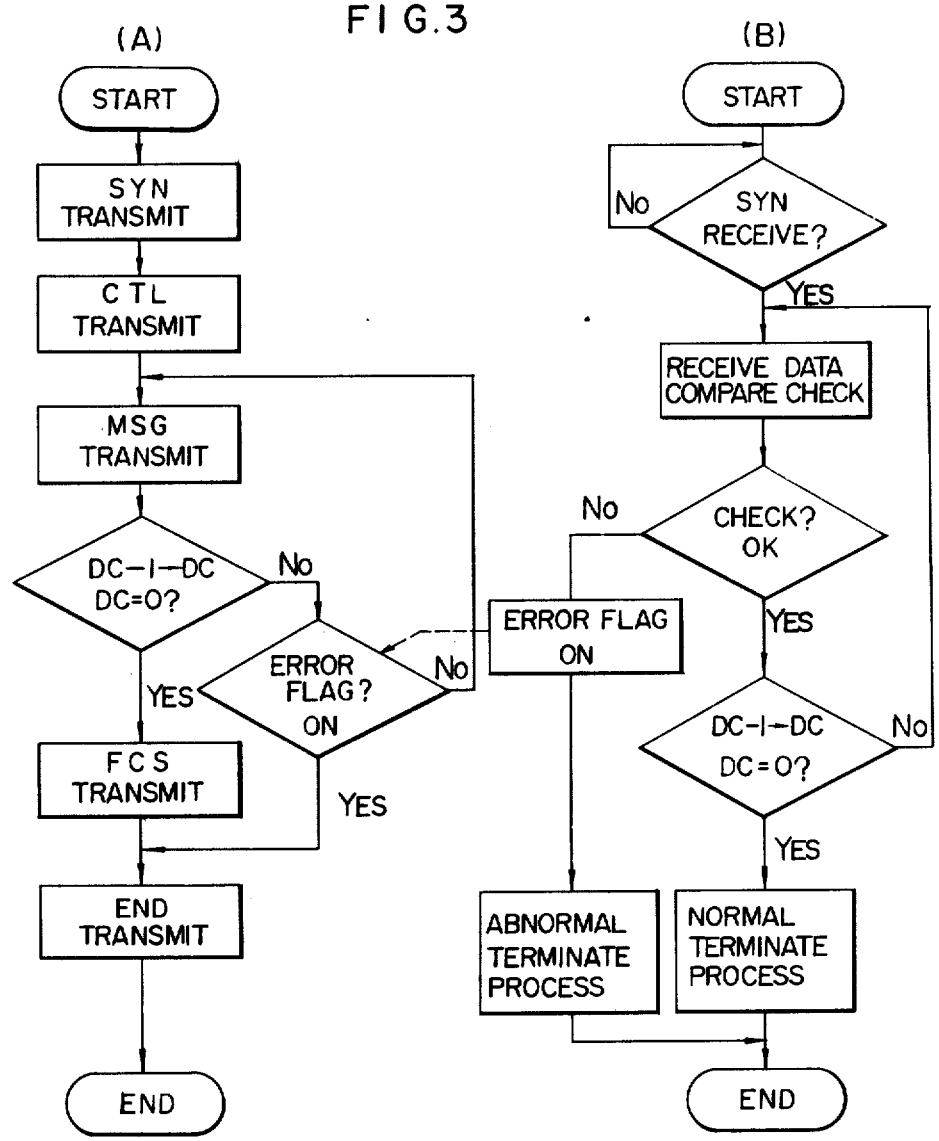
FIGS. 3 and 4 are flow charts illustrating the operation of a transmit station and a receive station respectively in the system according to the present invention.

FIG. 3 is a flow chart illustrating the operation of a transmit station in the loop type data highway system embodying the present invention. The transmit station starts transmission of a frame when data supplied from the computer or process input/output unit connected therewith are written in its buffer memory. The operation of the transmitter in the transmit station is illustrated in (A) of FIG. 3. After transmission of the SYN part and CTL part, the MSG part stored in the buffer memory of the transmit station is transmitted. Unity is subtracted from the transfer data count DC each time one word is transmitted, and the transmission of the MSG part is continued until the result of subtraction provides zero. Further, the transmit station executes error code generation while transmitting the MSG part. When the transfer data count DC is counted down to zero, that is, after the complete transmission of the MSG part, the result of error code generation appearing at that time is transmitted as the FCS part, and the end code END is then transmitted to complete the operation of the transmitter.

The operation of the receiver in the transmit station is illustrated in (B) of FIG. 3. The receiver of the transmit station receives the SYN part and then the CTL part and MSG part of the frame transmitted from the transmitter of its own and arriving after travelling round the loop. At the same time, the transmit station in the receive mode carries out a compare check to detect coincidence between the received data and the content of its buffer memory registered before the transmission. This compare check is continued until the received data count DC is counted down to zero. When the result of the compare check on all the data is correct, the station decides that the received data are normal, and a normal terminate process proceeds.

In the event of detection of non-coincidence between the received data and the data stored in the buffer memory during the compare check, the station sets an error flag for controlling the transmitter, and an abnormal terminate process proceeds. When the transmitter is still transmitting the data at this time, the station checks the presence of an error flag while the transmitter is transmitting the MSG part, as shown in (A) of FIG. 3. When the station detects the setting of an error flag, it ceases transmission of ensuing data and transmits the end code END to stop the data transmitting operation.

Figure 4:
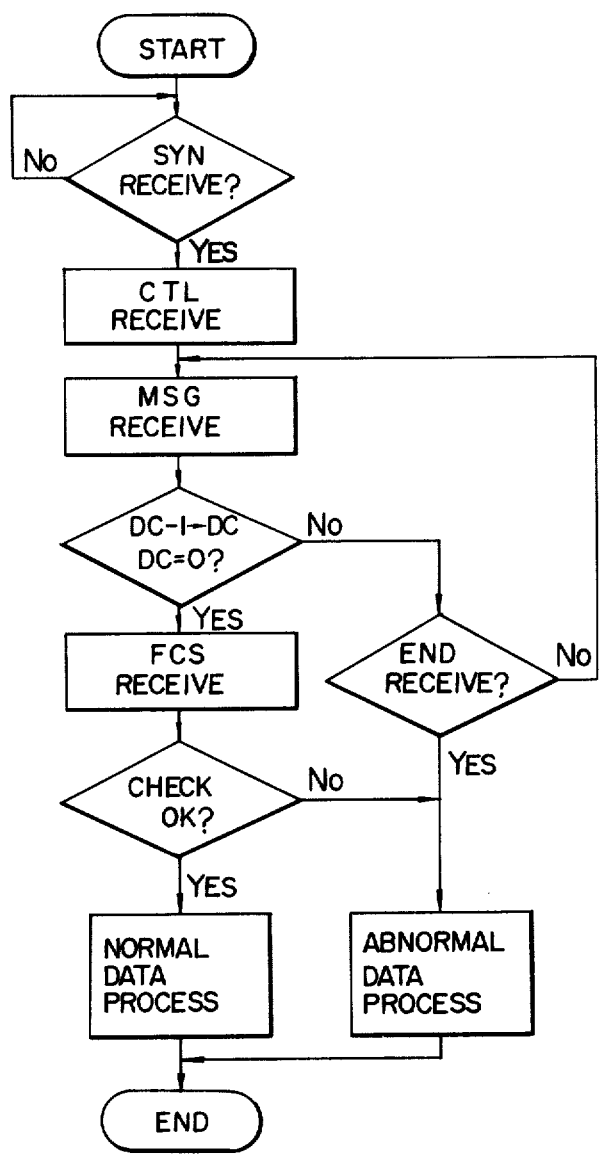

FIG. 4 is a flow chart illustrating the operation of a receive station. In the receive station, arrival of the SYN part of the frame transmitted from a transmit station is continuously monitored.

The receive station recognizes the fact that it is selected by reference to the CTL part of the frame arriving after the SYN part. The receive station receives data words in the MSG part one after another, and at the same time, count-down of the received data count DC is started. The CTL part of the frame presents the received data count DC to the receive station. The receive station continues to receive the data until the received data count DC is counted down to zero, and it executes error code generation, at the same time. Upon count-down of the data count DC to zero, the result of error code generation at that time is compared with the content of the FCS part received after the MSG part. A normal data process proceeds when coincidence is detected therebetween, while an abnormal data process proceeds when non-coincidence is detected therebetween. In the meantime, the receive station receiving the data makes a continuous check for reception of the end code END when the data count DC is not counted down to zero. The same abnormal data process as that above described proceeds upon reception of the end code END before the data count DC is counted down to zero. The above method ensures error detection in the receive station at a percentage of almost 100%.

Upon error detection in the receive station, the transmit station can immediately cease the data transmission. Thus, useless data transmission is prevented to improve the efficiency of data transmission.

Figure 5:
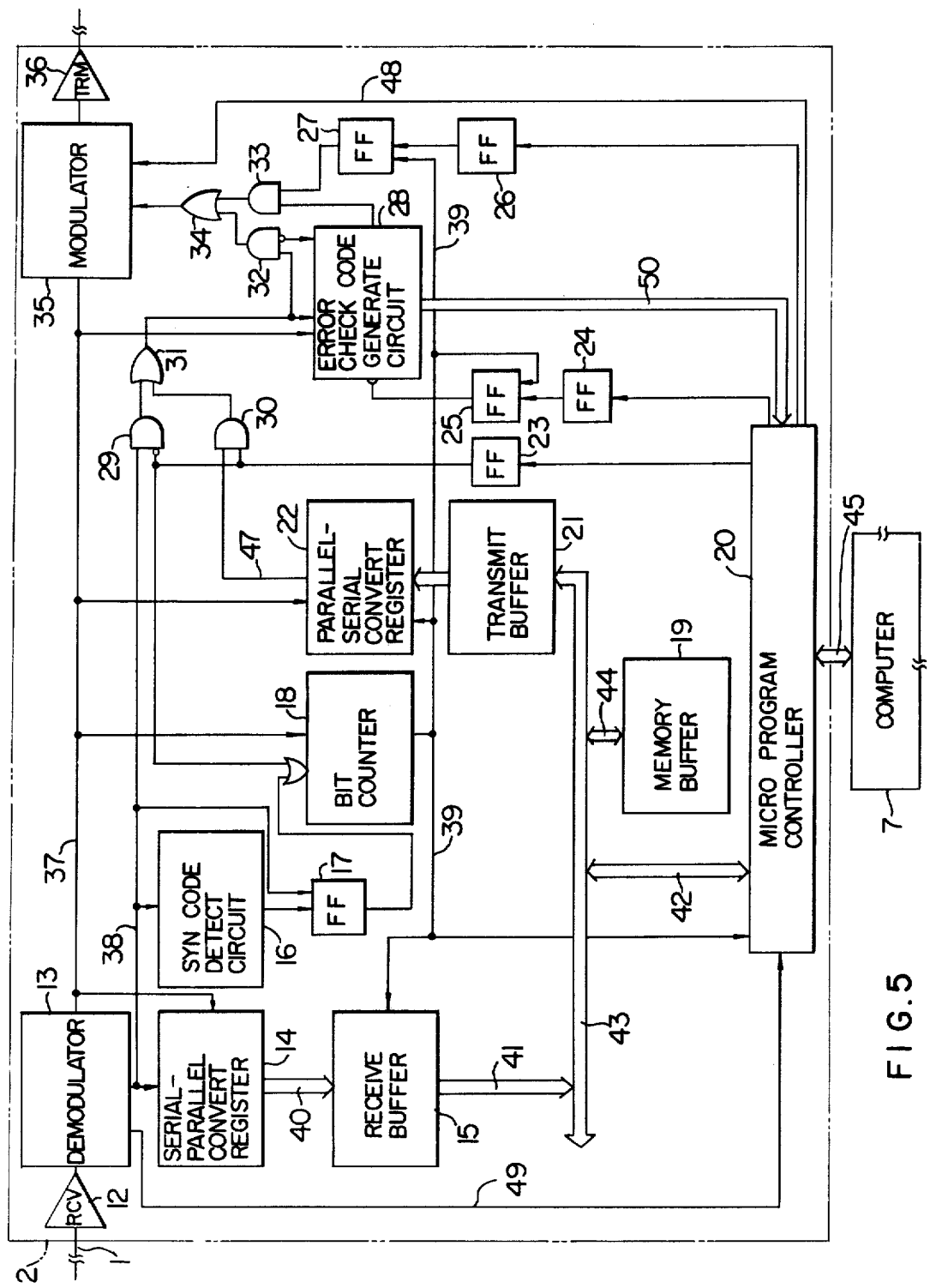
FIG. 5 is a connection diagram of one of a plurality of stations in an embodiment of the system according to the present invention.

FIG. 5 shows a preferred form of the structure of one of the stations which operates in the manner described hereinbefore. The structure shown in FIG. 5 represents that of the station 2 shown in FIG. 1.

Referring to FIG. 5, the signal received by way of the loop transmission line 1 is applied through a receiver 12 to a demodulator 13 to be separated into a clock signal 37 and a data signal 38. This data signal 38 is applied to one input terminal of a serial-parallel convert register 14, a synchronizing code detect circuit 16 and an INHIBIT gate 29. The serial-parallel convert register 14 receives the data signal 38 in bit serial fashion in synchronous relation with the timing provided by the clock signal 37, and a parallel signal 40 appears at the output of the register 14. The synchronizing code detect circuit 16 detects the synchronizing code SYN in the data signal 38 and acts to set a SYN detect flip-flop 17 for actuating a bit counter 18. This bit counter 18 starts its counting operation when the SYN detect flip-flop 17 is set or when a transmit mode flip-flop 23 is set. The bit counter 18 counts the clock pulses of the clock signal 37 and delivers a set pulse 39 each time it counts a predetermined number of bits, for example, 8 bits as a byte count. The INHIBIT gate 29 functions to pass the data signal 38 to the next station 3 through a loop transmission line portion 1' when the transmit mode flip-flop 23 is not set, that is, when the station 2 is not a transmit station.

Describing more specifically, the data signal 38 passes through the route including the INHIBIT gate 29, an OR gate 31, an INHIBIT gate 32, an OR gate 34, a modulator 35, and a transmitter 36 to appear on the loop transmission line portion 1'. The INHIBIT gate 32 does not inhibit the passage of the data signal 38 therethrough when the station 2 is not a transmit station, since in this case, an FCS transmit flip-flop 27 is kept reset. Thus, when the station 2 is not a transmit station, the received data signal is passed intact to the next station 3 through the modulator 35 and transmitter 36, so that the data signal travels necessarily round the loop to return to a transmit station.

In response to the application of the set pulse 39 from the bit counter 18, a receive buffer 15 is actuated to store therein the output 40 of the serial-parallel convert register 14. The set pulse 39 is also applied as an interrupt input to a micro-program controller 20. In response to the application of the set pulse 39, a microprogram stored in the micro-program controller 20 is run so that the output 41 of the receive buffer 15 is applied to the micro-program controller 20 by way of data buses 43 and 42 and to a buffer memory 19 by way of data buses 43 and 44.

The station 2 operates in a manner as described below when it is selected as a transmit station. The computer 7 connected to the transmit station 2 supplies data to the micro-program controller 20 through an interface 45, and the data thus supplied are written in the buffer memory 19 by way of the data buses 42 to 44. Upon completion of data writing, the availability of the loop 1 is confirmed. Then, the micro-program controller 20 applies a request-for-transmit signal 20-a to the transmit mode flip-flop 23 to set the same, and at the same time, the micro-program controller 20 sets the SYN pattern in a transmit buffer 21 by way of the data buses 42 and 43. The bit counter 18 starts to count the received clock signal 37 in response to the setting of the transmit mode flip-flop 23, and the set pulse 39 appears from the bit counter 18 each time it counts the predetermined number of bits as described hereinbefore. In response to the appearance of the set pulse 39 from the bit counter 18, the content of the transmit buffer 21, that is, the SYN pattern is set in a parallel-serial convert register 22 by way of a data bus 46, and the output 47 appearing from the parallel-serial convert register 22 in synchronism with the timing provided by the clock signal 37 passes through an AND gate 30 and the OR gate 31. Provided that the FCS transmit flip-flop 27 is kept reset, the output 47 of the parallel-serial convert register 22 passes then through the INHIBIT gate 32 and OR gate 34 to the modulator 35 to appear on the loop portion 1' from the transmitter 36.

Further, due to the application of an interrupt input to the micro-program controller 20, the internal microprogram is run so that information of the CTL part of the frame are read out from the memory buffer 19 to be set in the transmit buffer 21 as in the case of the SYN pattern. Upon completion of the execution of the transmit program portion corresponding to one word to be transmitted, a jump to a receive program portion of the micro-program stored in the micro-program controlller 20 occurs, and a received SYN check program portion is then run to read the content of the receive buffer 15 for the purpose of checking. Similarly, in the case of transmission of data of the MSG part of the frame, a transmit program portion corresponding to one data word to be transmitted and a receive program portion for running the SYN check program portion are alternately executed each time one interrupt input provided by the set pulse 39 is applied to the micro-program controller 20.

The output 47 of the parallel-serial convert register 22 is applied through the gates 30 and 31 to an error code generate circuit 28 when the station 2 operates as the transmit station. A set signal is applied to a flip-flop 24 from the micro-program controller 20 before the error code generate circuit 28 starts error code generation. The output of this flip-flop 24 is connected to an error code generate flip-flop 25. The flip-flop 25 is set in response to the application of the next set pulse 39 appearing from the bit counter 18 so that the error code generate circuit 28 starts to operate in synchronism with the data to be transmitted. Each time one data word is transmitted, the receive program portion is run to detect the SYN code. Then, as shown in (B) of FIG. 3, a data compare check program portion for each word is executed so that the received data read out from the receive buffer 15 and the corresponding data read out from the memory buffer 19 are successively subjected to a compare check in the micro-program controller 20.

The micro-program controller 20 comprises a transmitted data count register (not shown) from which unity is subtracted each time one word is transmitted, and a flip-flop 26 is set when the registered data count is counted down to zero. Thus, the set pulse 39 appearing from the bit counter 18 after transmission of the last data acts to set the FCS transmit flip-flop 27, and the FCS part, that is, the result of error code generation by the error check code generate circuit 28 is applied through an AND gate 33 and the OR gate 34 to the modulator 35 to be transmitted by the transmitter 36.

On the other hand, when an error is detected as a result of the compare check during the execution of the receive program portion in the transmit station 2, or when the FCS part of the frame is normally transmitted, the micro-program controller 20 applies a request-for-END-transmit signal 48 to the modulator 35. Thus, the signal representing the END code appears on the loop portion 1'.

The station 2 operates in a manner as described below when it is selected as a receive station. In the absence of the request-for-transmit signal 20-a, the transmit mode flip-flop 23 is kept in the reset state, and the bit counter 18 does not start its counting operation until the SYN code is detected. When now the SYN code is detected by the SYN code detect circuit 16, the SYN detect flip-flop 17 is set to actuate the bit counter 18. Therefore, the receive operation is started in synchronism with received data as described hereinbefore. Each time one data word is received, such data are set in the receive buffer 15, and at the same time, an interrupt input is applied to the micro-program controller 20. The receive program portion of the micro-program is run to write the data in the buffer memory 19. At the same time, the error code generation is also made in a manner entirely similar to that described with reference to the case in which the station 2 operates as the transmit station.

The received data count provided by the CTL part of the frame is registered in the receive data count register provided in the micro-program controller 20, and unity is substracted from the registered data count each time one data word is received. When the registered data count is counted down to zero, the signal 50 representing the result of error code generation in the error code generate circuit 28 is applied to the micro-program controller 20. In the program portion run in response to the application of an interrupt input upon reception of the FCS part of the frame, the micro-program controller 20 executes a check for detecting an error, and depending on the result of this check, it decides whether the already received data are to be subjected to a normal data process or an abnormal data process. The normal data process refers to, for example, a process in which received data are correct and the content of the buffer memory 19 is to be supplied to the computer 7. The abnormal data process refers to, for example, a process in which data received and stored in the buffer memory 19 are discarded due to the existence of an error, and the station 2 waits arrival of data again from the transmit station.

The receive station receives the end code signal before complete reception of data since the transmit station sends out the end code signal as soon as an error is detected before complete transmission of the data. In this case, the demodulator 13 applies an interrupt input 49 to the micro-program controller 20. Thus, when the end code signal appears before the registered data count is counted down to zero, the micro-program controller 20 acts to run an end code receive flag, and an abnormal data process proceeds as described with reference to FIG. 4. In this manner, the embodiment of the present invention shown in FIG. 5 can carry out the operation shown in FIGS. 3 and 4.

According to the preferred form of the present invention, predetermined unit lengths of data stored in a buffer memory before being transmitted and the corresponding ones of the data returning after travelling round the loop are subjected to a compare check in a transmit station. Therefore, even when a receive station fails to detect an error involved in the transmitted data, such an error can be reliably detected in the transmit station. As soon as such an error is detected, the transmit station ceases transmission of the data immediately and transmits an end code signal to inform the receive station of the occurrence of the error, thereby improving the reliability of the transmitted data. According to the present invention, further, data transmission is ceased as soon as an error is detected in the transmitted data and without waiting arrival of the FCS field of the frame. It is therefore possible to improve the transmission efficiency of the loop. The present invention providing the above advantages can be utilized most effectively for the error check control of a system which requires high reliability or a system which handles a large amount of data.

We claim:

1. A loop type data highway system comprising a plurality of stations connected in series in a loop transmission line for transmission of information in the form of bits from one of said stations selected as a transmit station to another one selected as a receiving station, each of said stations comprising
    (a) means for memorizing information to be transmitted in the form of bits when said each station is selected as the transmit station,
    (b) means for transmitting a data frame including at least said information and an end signal indicating the end of said data frame to a station next to said each station when said each station is selected as the transmit station,
    (c) means for passing the data frame received from a preceding station to the next station except when said each station is selected as the transmit station,
    (d) means for making a comparison check when said each station is selected as a transmit station by comparing said memorized information with the information included in the data frame, which has been transmitted from said each station, passed through the remaining stations and then returned to said each station, on a predetermined number of bits by bits basis successively and for producing an error signal immediately when said bits-by-bits comparison indicates non-coincidence between them,
    (e) means responsive to said error signal to cause said each station to interrupt transmission of said information and transmit the end signal when said each station has been selected as a transmit station, and
    (f) means for receiving the data frame transmitted from the preceding station when said each station is selected as the receiving station and determining that the information included in said received data frame includes error when the end signal is received prior to receiving a predetermined number of bits of said information.

2. A system according to claim 1, wherein said data frame further includes a synchronizing code which is transmitted in advance of transmission of said information and used for frame synchronization, and said system further comprises means operative after transmitting said synchronizing code when said each station is selected as the transmit station to check, each time a predetermined number of bits of said data frame are received from the preceding station, whether the synchronizing code is included in said received bits and means for causing said comparison check to start upon detection of said synchronizing code.

3. A system according to claim 1, in which said information comprises a control field including data required for transmission control and a message field including a message to be transmitted in the form of bits, said system further comprising a counter which is initially set at a numerical value corresponding to the number of bits constituting message field when said each station is selected as the transit station, means for transmitting said message in divided unit by unit basis each unit including a predetermined number of bits of said message, means responsive to transmission of each one unit of said message to decrease the content of said counter by a value corresponding to said predetermined number of the bits in the unit, and means for causing said comparison check making means to make the comparison check for the transmitted one unit of the message when said decreased content of said counter is not "zero" and then allowing said message transmitting means to transmit the next one unit of the message when said comparison check indicates no error.

4. A system according to claim 1, in which said information comprises a control field including data required for transmission control and a message field including a message to be transmitted in the form of bits, said system further comprising a counter which is initially set at a numerical value corresponding to the number of bits constituting said message field when said each station is selected as the transit station, means for transmitting said message in divided unit by unit basis each unit including a predetermined number of bits of said message, means responsive to transmission of each one unit of said message to cause said comparison check making means to make said comparison check for the transmitted one unit of said message, means for decreasing the content of said counter by a value corresponding to the number of bits included in the one unit of said message when said comparison check indicates no error, and means for determining that the transmission of said message is completed without error when the content of said counter comes down to "zero".

5. A system according to claim 1, in which said information comprises a control field including data required for transmission control and a message field including a message to be transmitted, said message field being composed of a predetermined number of units each including a predetermined number of bits and said control field including numerical data indicative of the number of said units constituting said message, and said system further comprising a counter which is initially set at a value represented by said numerical data given by said control field and whose content is decreased by "one" upon reception of each one unit of said message when said each station is selected as the receiving station, and means for allowing said each station to receive the next one unit of said message only when the content of said counter is not "zero" and no end signal is received by said each station.

* * * * *